United States Patent [19]

Dupont et al.

[11] Patent Number: 5,974,106

[45] Date of Patent: Oct. 26, 1999

[54] METHOD AND APPARATUS FOR MULTIRATE DATA COMMUNICATIONS

[75] Inventors: Pierre B. Dupont, Whistler; Ronald H. Gerhards, Vancouver, both of Canada; Stephen Lee Spear, Skokie, Ill.

[73] Assignee: Motorola, Inc., Schaumburg, Ill.

[21] Appl. No.: 08/522,905

[22] Filed: Sep. 1, 1995

[51] Int. Cl.$^6$ .................................................. H04L 23/00
[52] U.S. Cl. ......................... 375/377; 375/219; 375/259; 455/73; 341/61
[58] Field of Search .................................... 375/219, 220, 375/222, 259, 260, 287, 377; 455/73; 370/442, 498; 341/61, 60

[56] References Cited

U.S. PATENT DOCUMENTS

| | | | |
|---|---|---|---|
| 4,663,766 | 5/1987 | Bremer | 375/231 |
| 4,780,883 | 10/1988 | O'Connor et al. | 375/377 X |
| 4,782,498 | 11/1988 | Copeland, III | 375/377 X |
| 4,785,466 | 11/1988 | Lee et al. | 375/377 X |
| 4,833,696 | 5/1989 | Ichiyoshi | 375/377 |
| 4,887,280 | 12/1989 | Reisenfeld | 375/377 |
| 5,214,650 | 5/1993 | Renner et al. | 370/442 |
| 5,345,474 | 9/1994 | Hoshikawa | 375/219 |

*Primary Examiner*—Chi H. Pham
*Assistant Examiner*—Bryan Webster
*Attorney, Agent, or Firm*—John B. MacIntyre

[57] ABSTRACT

In one embodiment a system is provided for multirate communications allowing for different data rates for each data unit on a channel, including both data units from different mobile units and from the same mobile unit. A sending unit preferably begins by determining the rate at which to start communications, and monitors, for example by use of an RSSI detector, for an indication that the rate should be changed. A rate adjustor implements the change, and can make changes as frequently as every data unit. The encoder applies the appropriate rate and inserts a rate indicator indicative of the data or encoding rate, and sends the data unit. On receiving data units, the receiving unit first determines the rate for each data unit or group of units, then appropriately decodes the data unit(s). As a result, the actual data throughput can be adjusted to permit optimized throughput.

4 Claims, 2 Drawing Sheets

METHOD AND APPARATUS FOR MULTIRATE DATA COMMUNICATIONS

FIELD OF THE INVENTION

The present invention relates to communications and more particularly an improved method for communicating multirate data in a communications system.

BACKGROUND

In recent years there has seen a tremendous increase in the demand for wireless networks capable of handling data communications. In order to accommodate this increased demand there is a constant search to find improved, more efficient approaches to communicating data. One such approach has been to suggest multiple rates for communicating data. In the case of voice communications this is primarily important in permitting a higher quality signal for those units having the higher data rates, although in some systems it may also permit increased loading by having users go to lower rates (and hence produce somewhat lower interference levels). In non-voice data communications the concerns are somewhat different. Because the data rate directly effects the throughput, most users will prefer to use a higher rate, thus keeping air/billing time to a minimum. However, system flexibility is still desirable, allowing for lower rates to be used for channels suffering from higher levels of interference, thus permitting increased correction coding rates to be employed.

One limitation of current or proposed multirate coding schemes is that the rate is typically established at the beginning of a communications session. While this may be fine for a more or less stationary remote unit, it does not allow for changes in moving remote units or the surrounding environment. Thus, for example, if a user were to initiate a file transfer from a PDA (personal digital assistant), which finally received an allocation right before entering a shadowed region (turning a corner behind a building, entering a tunnel, etc.) a higher data rate would typically be negotiated. But, because the majority of the communication session would occur in the shadowed region, the continued use of the higher data rate will lead to a higher error and repeat transmission rate. Similarly, if the user were to start communications within a shadowed region, say a parking garage, but the majority of the session was completed in a good quality coverage zone, significantly more time will be required than actually needed to complete the data transfer. This is disadvantageous both to the user, who pays more, and the operator, who's limited channel resources are tied up needlessly, even potentially blocking higher priority uses. Finally, as both examples indicate, where multiple users having quite different channel characteristics are accessing the same communication channel, a single rate applied to both such as done in prior art systems is at best a compromise detrimentally effecting both users.

There remains therefore a need for an improved means for providing multirate data communications in wireless systems that solves these and related problems.

DETAILED DESCRIPTION

These problems and others are solved by the improved method according to the invention. A presently preferred embodiment of the invention provides for changing a data rate on the fly, so that the rate for data units of the same communication is adjusted to take into account changes such as channel quality. A sending unit determines the rate at which to start communications, and monitors, for example by use of an RSSI detector, for an indication that the rate should be changed. A rate adjustor implements the change, and can make changes as frequently as every data unit. The encoder applies the appropriate rate and inserts a rate indicator indicative of the data or encoding rate, and sends the data unit. On receiving data units, the receiving unit first determines the rate for each data unit or group of units, then appropriately decodes the data unit(s). As a result, the actual data throughput can be adjusted to take into account rapidly changing factors, insuring an optimized throughput for the user and improved communications resource utilization for an operator.

Figure 1:
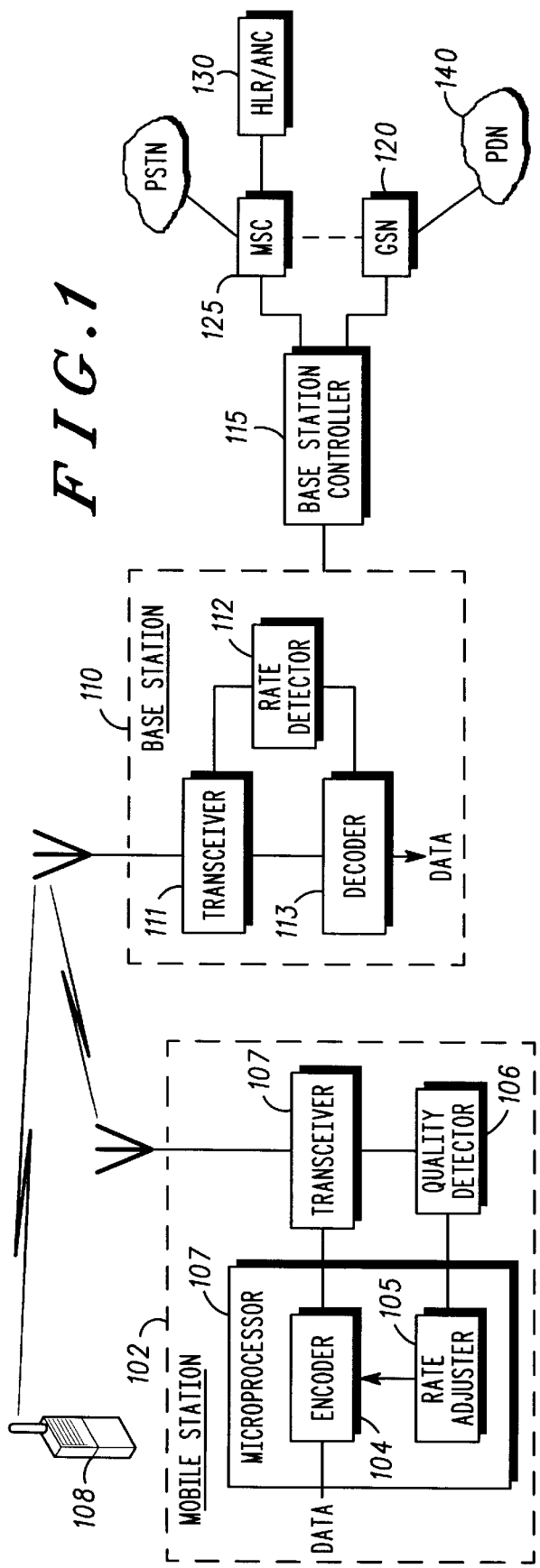
FIG. 1 is a block diagram of a wireless communications system according to one embodiment of the invention described in detail below.

Turning first to FIG. 1, a communications system 100 is generally depicted having one or more subscriber units (i.e., mobile stations (MSs) 101 and 102) communicating via a base station (BS) 110 and base station controller (BSC) 115. The subscriber units may be of such diverse types as dedicated data units (e.g., personal digital assistants (PDAs)), radiotelephones including those adapted for coupling with data terminals (e.g., portable computers), or wireless adapter devices (e.g., wireless modems adapted for coupling with computers, message pads, etc.), and the like. The subscriber unit 102 preferably includes a processor 103 and transceiver 107, the processor including an encoder 104 and rate adjustor 105. The encoder receives data input and applies a rate determined by the rate adjustor 105 using input from a rate determination unit such as quality detector 106. Thus, in response to a determination that factors such as channel quality have changed, quality detector 106 signals rate adjustor 105, which appropriately adjusts the data or encoding rate for the next adjustable data unit and inserts the appropriate rate indicator. The rate indicator is preferably chosen from one of a possible set of data unit synchronization flag bits, each one of the set being indicative of a different rate.

The base station (BS) 110 preferably includes a transceiver 111 for receiving the data unit, a rate detector 112 for determining the coding or data rate, and a decoder 113. The rate detector is designed to detect the rate indicator and inform the decoder of the appropriate rate to use in decoding each data unit.

The encoder 104 and transceiver 107 (including other circuitry not shown such as a modulator) of the subscriber 102 and the infrastructure circuitry are appropriately programmed for data communications according to a serving systems protocols. In the illustrated case a combined GPRS-GSM system is shown, although it will be recognized that the embodiments discussed herein are equally applicable to any other wireless communications system, including CDPD (cellular digital packet data), CDMA (code division multiple access), and dedicated data systems like ARDIS or RAM. In the illustrated case, the portion of the GSM system servicing voice subscribers includes an MSC (mobile switching center) 125 connected to an HLR/AuC (home location register/authentication center) 130 and PSTN (public switched telephone network) 150. The GPRS portion includes a GSN (GPRS service node) 120 connected to a packet switched PDN (public data network). GSN 120 includes all information necessary for appropriate routing of data messages; it may alternatively be coupled to MSC 125 to allow access to higher layer user information stored at a common platform such as HLR 130.

Figure 2:
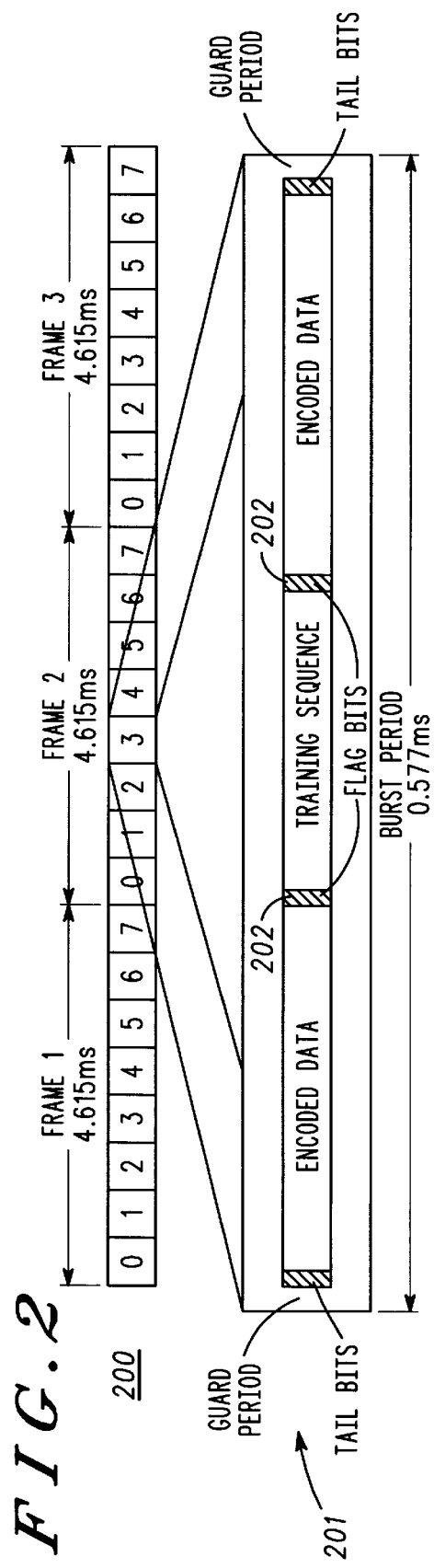
FIG. 2 is a diagram illustrating a burst structure in accordance with the embodiment of the invention described in detail below.
Figure 3:
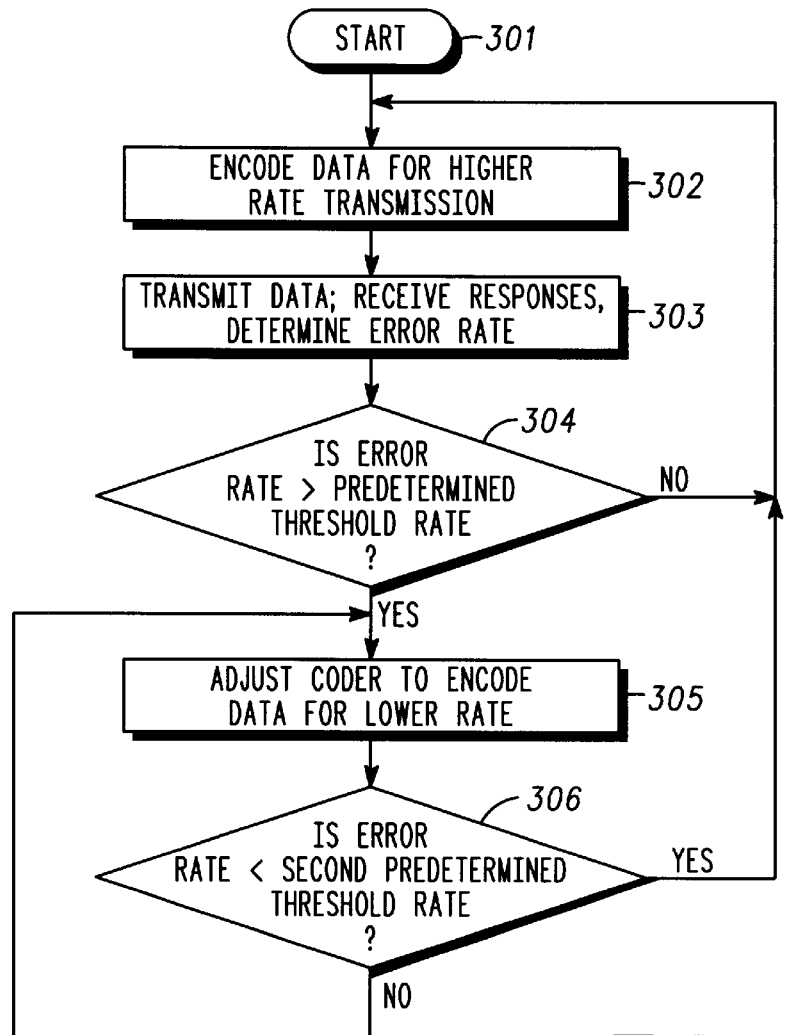
FIG. 3 is a flow chart illustrating a method for a sending multirate communications in accordance with the preferred embodiment of the invention.
Figure 4:
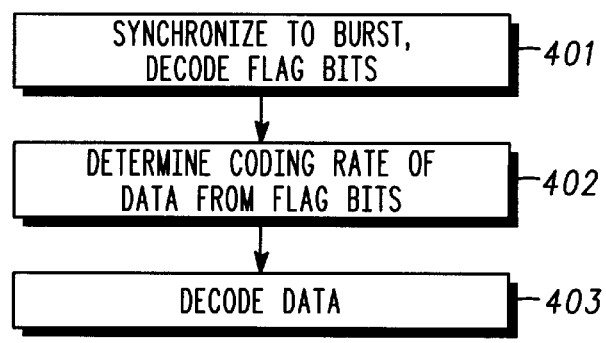
FIG. 4 is a flow chart illustrating a method for receiving multirate communications in accordance with the preferred embodiment of the invention.

The operation of this system can be further understood by additional reference now to FIGS. 2 through 4. FIG. 2 illustrates a frame/burst 200 structure for one embodiment of the invention. Each frame of a GPRS channel includes repeating time slots or subchannels, each time slot capable of carrying a communication burst. A first sender 102 transmits first data units (e.g., data units 210) and a second sender 108 transmits second data units (e.g., data units 220). One such burst is shown in expanded form as burst 201. This GPRS data burst includes encoded data and a mid-amble training sequence, with synchronization flag bits 202 on either side of the synchronization sequence. While it is known to use two types of synchronization flag bits in some bursts of a GSM system, such prior uses were limited to distinguishing special signaling burst being sent on a traffic channel from the typical data burst, on a few channels between signaling and data bursts. No provision was made for distinguishing rates at the data unit level, which might be expected for a system primarily designed for voice data. In the preferred embodiment for a GPRS system using similar burst structures as the GSM system, the prior structure can be advantageously improved by using a set of up to four possible synchronization flag bits (e.g., 00, 01, 10, and 11) to indicate the coding rate for its data unit. Where the data unit structure is such that the same coding rate is applied to a sequence of bursts, for example where each MAC (medium access control) codeword is formatted to occupy a burst group of four bursts, the synchronization flag bits of all four bursts of the burst group can be used to either expand the possible set (possibly to even send additional information besides the data unit rate) or protect against an erroneous rate detection (e.g., by a majority vote of from all bursts of the burst group).

When sending data, such as illustrated by the approach of FIG. 3, it is typically preferable to begin encoding data at the highest available rate (steps 301, 302), unless some prior indication of interference or other factors (such as a broadcast message from a base station) indicates otherwise. For efficiencies in transmission, given the bursty nature of most non-voice data, it is advantageous to break up the data message into data packets or cells, which may be further multiplexed into smaller data units to fit for some protocols. For example, in GPRS it has been proposed for data packets to be formed into a sequence of MAC layer service data units (SDUs), each of these SDUs being further formed into four packet data units (PDUs) each being multiplexed into its own burst period (i.e., time slot) of a four-burst burst group. It is thus evident that many possible structures exist based upon the implementational specifics of a given system, unit or protocol. It is significant that the present invention allows the rate of communications to vary in the same channel among all the users and even between immediately adjacent bursts/data units of the same user. This in turn allows for a much more efficient utilization of the channel for both the users and the operator.

After transmitting the data, the sending unit receives information for use in determining the appropriate data rate. In most cases this will probably be responses from the receiving unit. For example, the sending unit typically receives ACK (acknowledgment), NACK (non-acknowledgment) or even S-ACK (selective acknowledgment) signaling informing it whether the transmissions were received ok. Where a measure of the actual transmission quality (such as an RSSI (received signal strength indication) or BER or WER (bit error rate or word error rate) is sent back, the quality detector 106 preferably compares this measure against one or more threshold values to determine whether the rate needs to be adjusted (steps 304, 306). In the alternative, a corresponding quality measure can be used, for example by measuring the quality (RSSI, WER, etc.) of any downlink signaling (even adjacent subchannels on the same channel) from the base station 110, which should give a fairly accurate indication of the uplink channel quality since the same transmission path is being used. Additional information could also be used in the rate determination unit beyond channel quality, including the use of special control signaling, including but not limited to broadcast messages directing subscribers to transmit at specified rates.

Upon receiving the appropriate information, detector 106 determines the rate at which transmission. or alternately, coding, should be done, and communicates this information to the rate adjustor 105 (steps 303, 304). Rate adjustor 105 then controls the encoder 104 to encode that data units at the appropriate rate.

At the receiving unit, illustrated by base station 110 (but which could also be a downlink or peer-to-peer communication), multirate data is preferably decoded by first detecting the rate indicator of the data unit. Again, for systems like GPRS the rate indicator is preferably the data unit flag bits, so the detection is accomplished by synchronizing to the burst's synchronization sequence and reading the flag bits (step 401 of FIG. 4). Depending on which of the set of flag bits is present, the corresponding coding rate is applied to decode the data unit (steps 402, 403).

While the invention has been described in conjunction with specific embodiments thereof, it is evident that many alterations, modifications, and variations will be apparent to those skilled in the art in light of the foregoing description. For example, while processor 102, detectors 106 and 112, and other circuits, are described in terms of specific logical/functional circuitry relationships, one skilled in the art will appreciate that such may be implemented in a variety of ways, such as appropriately configured and programmed processors, ASICs (application specific integrated circuits), and DSPs (digital signal processors). Further, the invention is not limited to the illustrated cellular systems, but has applicability to any data system. Thus, it should be understood that the invention is not limited by the foregoing description of preferred embodiments, but embraces all such alterations, modifications, and variations in accordance with the spirit and scope of the appended claims.

We claim:

1. A method of communicating data in a communications system comprising:

encoding a first service data unit into plural packet data units all at a first data rate, including inserting a synchronization sequence and synchronization flag bits wherein the synchronization flag bits form an indicator of the first data rate;

transmitting plural packet data units;

determining that an error measure for at least some of the plural packet data units exceeds a predetermined threshold;

determining a second data rate based on the error measure for at least some of the plural packet data units; and encoding a second service data unit into plural packet data units at the second data rate, including a further synchronization sequence and further synchronization flag bits wherein the further synchronization flag bits form an indicator of the second data rate.

2. A method of communicating data from multiple senders to a single receiver over a common transmission channel in a communication system comprising:

encoding first data units from a first sender at a first data rate, including inserting into each first data unit a synchronization sequence and synchronization flag bits wherein the synchronization flag bits form an indicator of the first data rate;

transmitting the first data units from the first sender on the common transmission channel to the single receiver;

encoding second data units from a second sender, at a second data rate, including inserting into each second data unit a further synchronization sequence and further synchronization flag bits wherein the further synchronization flag bits form an indicator of the second data rate;

transmitting the second data units from second sender on the common transmission channel to the single receiver;

determining from the synchronization flag bits that were inserted into the first data unit the first data rate; and determining from the further synchronization flag bits that were inserted into the second data unit the second data rate, wherein the further synchronization flag bits inserted into the second data unit indicate a same data rate as that of the synchronization flag bits inserted into the first data unit.

3. A method of communicating data units from multiple senders at multiple rates to a single receiver over a common transmission channel in a communications system, the method comprising:

receiving a first data unit including a data unit rate indicator, wherein the data unit rate indicator comprises one of a set of synchronization flag bits and the first data unit includes a synchronization sequence and first synchronization flag bits;

determining from the data unit rate indicator a rate at which the first data unit is encoded;

decoding the first data unit based on said rate;

determining that said rate should be changed;

transmitting a response indicative of a need to change said rate;

receiving a second data unit including a further synchronization sequence and further synchronization flag bits;

determining from the further synchronization flag bits that the second data unit is encoded at a second data rate; and decoding the second data unit based on said second data rate.

4. A communications unit for sending multirate data communications comprising:

a transceiver;

a processor, coupled to the transceiver, comprising an encoder operable to receive data and encode the data in data units each at one of plural rates, and a rate adjuster operable to control the encoder to encode the data units each at a selected rate; and a rate determination unit, coupled to the processor, operable to determine when to change from a first selected rate for a first data unit to a second selected rate for a following second data unit and communicating to the rate adjuster to change to the second selected rate, wherein the rate determination unit includes a channel quality detector for determining a channel quality corresponding to a quality measure of at least the first data unit, the channel quality detector comprising a comparison means for receiving error information from another communications unit receiving the data units and comparing the error information with a threshold to determine when to change from the first selected rate.

* * * * *